April 21, 1925. 1,534,740
E. H. SCHWARZ
GEAR SHIFTING MECHANISM
Filed Feb. 23, 1921 2 Sheets-Sheet 1
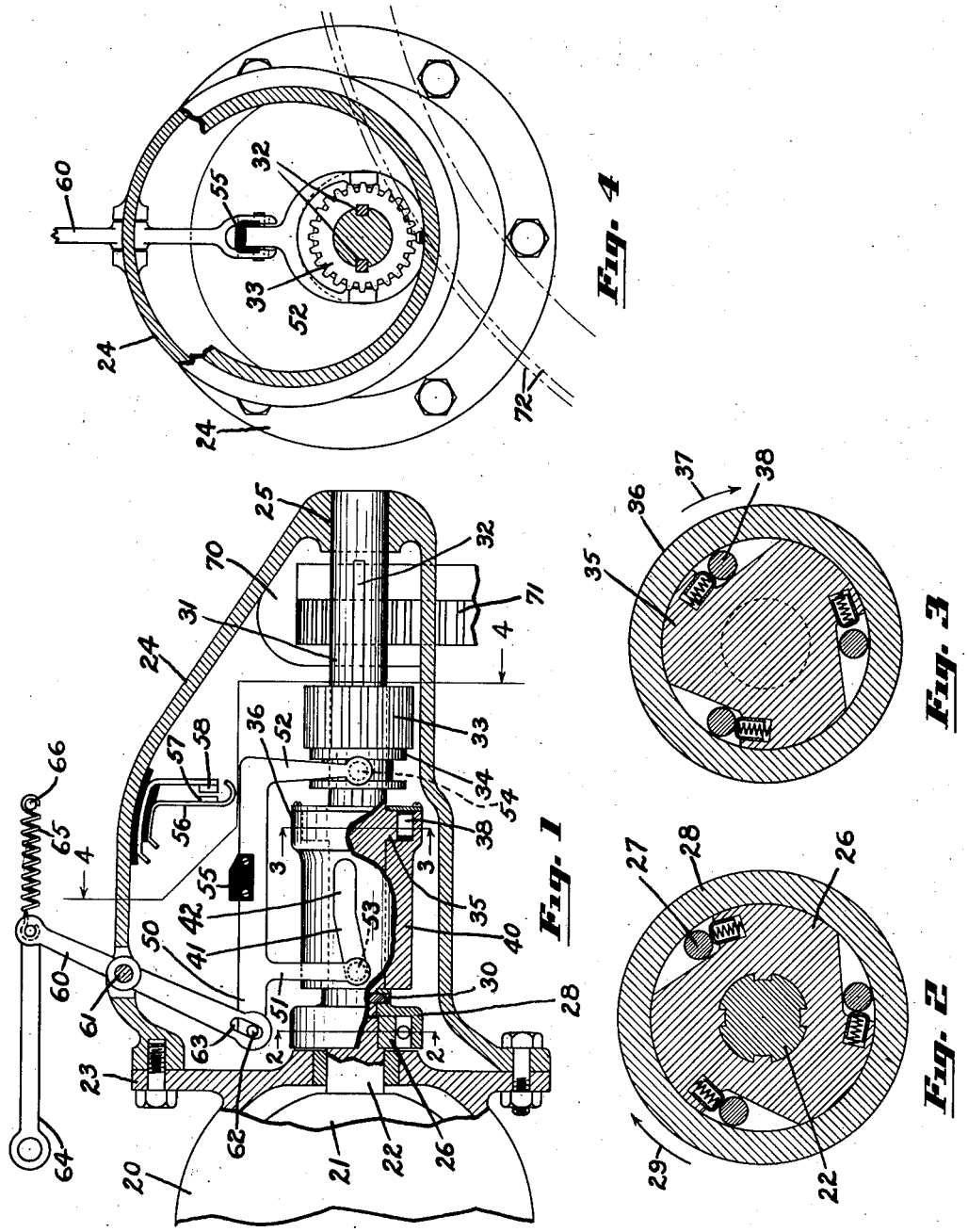
Witnesses
Irvin A. Greenwald
Lee T. Hollen
Inventor
Elmer H. Schwarz
Forrest B. MacNab
By Attorney

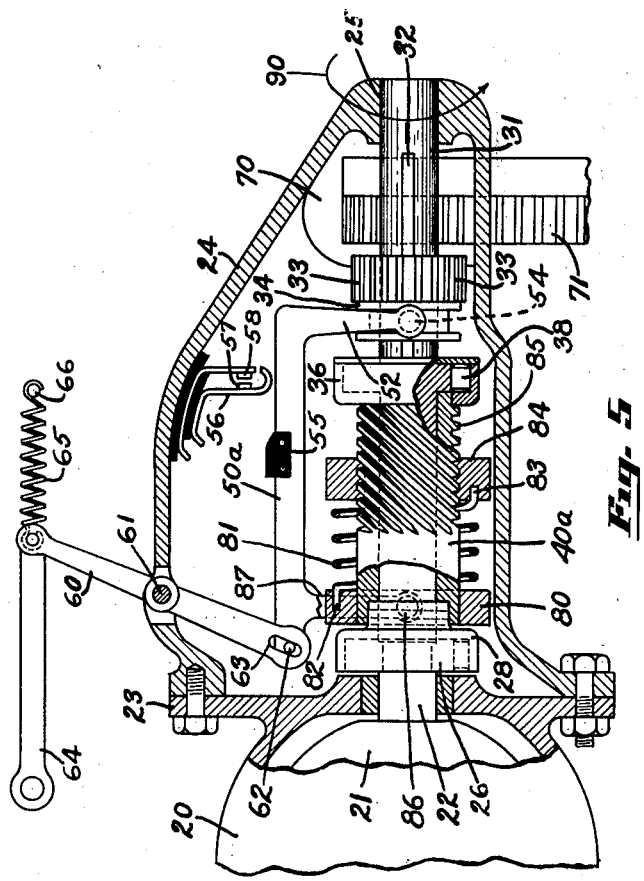

Patented Apr. 21, 1925.

1,534,740

UNITED STATES PATENT OFFICE.

ELMER H. SCHWARZ, OF FORT LEE, NEW JERSEY, ASSIGNOR TO THE DAYTON ENGINEERING LABORATORIES COMPANY, OF DAYTON, OHIO, A CORPORATION OF OHIO.

GEAR-SHIFTING MECHANISM.

Application filed February 23, 1921. Serial No. 446,998.

*To all whom it may concern:*

Be it known that I, ELMER H. SCHWARZ, a citizen of the United States of America, residing at Fort Lee, county of Bergen, State of New Jersey, have invented certain new and useful Improvements in Gear-Shifting Mechanism, of which the following is a full, clear, and exact description.

This invention relates to mechanisms for connecting gears which are normally disengaged and wherein it is not desirable to set one of the gears in operation until enmeshment of the gears has been effected. This invention applies particularly to starting devices for internal combustion engines wherein a driving pinion normally out of engagement with a gear connected with the engine is arranged to be driven by an electric motor.

It is an object of the present invention to provide means for connecting up the motor driven pinion with the engine gear before the motor is connected with the source of current, such a means being arranged to effect enmeshment of the pinion with the engine gear no matter whether or not the pinion teeth happen to be aligned with the tooth spaces of the engine gear before it is desired to effect enmeshment.

Other and further objects of this invention will be apparent from the following description, reference being had to the accompanying drawings, wherein preferred embodiments of the present invention are clearly shown.

In the drawings, Fig. 1 is a side view partly in section showing the mechanism for connecting a motor with an engine gear;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 1; and

Fig. 5 is a view similar to Fig. 1 of a modified form of the invention.

Referring to the drawings, 20 designates a portion of an electric motor of the usual construction provided with an armature 21 and with a shaft 22 having a bearing in an end frame 23. A housing 24 is connected with frame 23 and provides a bearing 25.

The shaft 22 terminates in a driving clutch element 26 arranged to drive through the clutch rollers 27 a driven clutch element 28 when said element 26 rotates in the direction of the arrow 29 shown in Fig. 2. The driven clutch element 28 is connected by means of a pin 30 with shaft 31. Shaft 31 is provided with keys 32 providing a sliding driving connection between the shaft 31 and pinion 33. Pinion 33 is provided with a grooved collar 34.

An intermediate portion of the shaft 31 is constructed to provide a driven clutch element 35 with which cooperates a driving clutch element 36 which, when rotated in the direction of arrow 37 (see Fig. 3) will rotate the clutch element 35 by means of a driving connection through the clutch rollers 38. The driving member 36 is provided with a sleeve 40 having diametrically opposite oblique slots, one shown at 41 running into a longitudinal slot 42. A shifting bar 50 is slidably supported by the housing 24 in any convenient manner and is provided with a yoke 51 and with a yoke 52. Each branch of yoke 51 carries a pin 53 cooperating with slot portions 41 and 42. The yoke 52 carries two opposite pins, one of which is shown at 54. These pins cooperate with sleeve 34. The bar 50 carries a non-conducting block 55 adapted to cooperate with a switch element 56 to close a pair of switch contacts 57 and 58. These contacts are for the purpose of closing the circuit between the motor 20 and a source of current. As these circuit connections are generally well understood a wiring diagram is deemed unnecessary.

In order to operate the bar 50 a shifting lever 60 is mounted by means of a pin 61 upon the housing 24. The lower end of lever 60 is connected by means of a pin and slot connection 62, 63 with the bar 50. The lever 60 is operated manually by any convenient means such as a rod 64 and is arranged to be restored to normal position shown in Fig. 1 by means of a spring 65 connecting the one end with the lever 60 and at the other end with a suitable stationary part indicated at 66.

The housing 24 is provided with an opening 70 into which projects an engine flywheel gear 71. This gear is indicated by dot and dash lines 72 in Fig. 4.

The operation of the invention is as follows:

The rod 64 is pulled to the left as viewed in Fig. 1 thereby causing the bar 50 to move to the right. Such movement will cause first the cooperation between the pins 53 and the oblique slots 41, thereby causing first the rotation of the clutch member 36 in the direction of the arrow 37 as viewed in Fig. 3. This will produce a rotation of the shaft 31 and the pinion 33 up to the time that the pinion 33 begins to engage the fly-wheel gear 71. In case the pinion teeth are now in alignment with the tooth spaces of the engine gear, the pinion 33 will be moved into full engagement with the flywheel gear 71. During this engaging operation no rotation of the pinion will take place since the pin 53 will then be moving through the longitudinal slot 42. After the pinion has been meshed with the flywheel gear 71 the block 55 will engage the switch member 56 and close contacts 57 and 58. The motor will be connected with a current source to effect the rotation of the pinion 33 in the starting of the engine. When the engine has become self-operative, the rod 64 may be released and the spring 65 will restore the mechanism to its inoperative position. The clutch mechanism 26, 27, 28, prevents the engine driving the motor.

In case the pinion 33 collides with the gear 71 the rod 64 will be released by the operator and the clutch member 41 will be restored to normal position as shown in Fig. 1. During this restoring movement of sleeve 40 the clutch member 35 will not be turned by the clutch member 36 since the driving of the part 35 can take place only in one direction. This moving of the pinion 33 toward the gear 71 and back again in the manner described will cause the pinion 33 to occupy a position slightly different from the position which it occupied originally with relation to the gear 71. Since each operation of the foot pedal turns the pinion from its previous position adjacent the engine gear, successive operations of the foot pedal progressively change the angular relation of the pinion and gear. The oblique slot 41 may be so arranged that the sleeve 40 can turn the pinion 33 through an angle substantially equal to one-half the angle between tooth centers. It is apparent that if such a construction is followed out, the second manual operation of the rod 64 will bring the teeth of the pinion 33 into registry with the tooth spaces of the gear 71.

Referring to Fig. 5 of the drawings, the driving clutch member 36 is provided with a sleeve 40ª upon which slides a washer 80. A spring 81 is connected at one end 82 with washer 80 and the other end 83 of said spring is connected with a nut 84 engaging a threaded portion 85 of the sleeve 40ª. The washer 80 is provided with diametrically opposite outwardly projecting pins, one of which is shown at 86. Each pin 86 is engaged by an arm 87 extending downwardly from the shifting bar 50ª. The other parts of the apparatus shown in Fig. 5 are substantially the same as the corresponding parts shown in Fig. 1.

When the rod 64 is pulled to the left, as viewed in Fig. 5, the shifting bar 50ª will move to the right, causing the pinion 33 to move toward the flywheel gear 71. Before the teeth of pinion 33 engage the teeth of the flywheel gear 71, the washer 80 will be moving toward the flywheel gear 71 and will impart longitudinal motion to the nut 84 by means of the spring 81. The washer 80 is held from rotation by means of its connection with the shifting bar 50ª. Since the nut 84 is restrained from any substantial amount of rotation by virtue of its connection with washer 80 through spring 81, the nut 84 will have practically only longitudinal motion. Therefore the threaded sleeve 40ª will be caused to turn in the direction of the arrow 90 and consequently the clutch driving member 36 will impart movement in the same direction to the shaft 31. If the pinion 33 comes adjacent to the gear 71 with its teeth aligned with the tooth spaces of gear 71, then enmeshment may take place upon further movement of the shifting bar 50ª. Since the engine gear 71 is stationary, the pinion 33 and hence the screw 85 can no longer rotate. Therefore, if pinion 33 is to be moved into full engagement with gear 71, this movement of pinion 33 must take place without the movement of the nut 84. This is possible since the washer 80 may be moved without moving the nut 84. Therefore it is apparent that during the movement of the pinion 33 to full engagement with the flywheel gear 71, the spring 81 will be compressed. When the engine becomes self-operative, it is apparent that when the rod 64 is released the spring 81 will assist the spring 65 in disengaging pinion 33 from gear 71.

In case the teeth of pinion 33 should collide with the teeth of gear 71, then rod 64 is released by the operator and the foregoing operation repeated. During the movement of the rod 64 to the right, as viewed in Fig. 5, and consequently the movement of the nut 84 to the left, rotation in a direction opposite to the arrow 90 will be imparted to the screw 85 and to the clutch element 36. However, no rotation of the shaft 32 will take place by virtue of the one way drive provided by clutch members 35, 36 and 38. By the proper location of the nut 84 in its initial position on the screw 85, the pinion 33 can be turned during the second operation of the rod 64 through such an angle that its teeth will be aligned with the tooth spaces of gear 71 when pinion 33 has been shifted adjacent the gear 71.

It is apparent that in both forms of the invention the driving pinion 33 is brought into engagement with the engine gear 71 to be driven by means of a device which effects rotation of the pinion prior to enmeshment with the gear 71 and by virtue of power which is entirely independent of the starting motor. Hence it is that the proper enmeshment of the starting gears is effected before any current is supplied to the motor. In this manner the possibility of injuring gear teeth is reduced to the minimum.

While the forms of mechanisms herein shown and described constitute preferred forms of embodiments of the invention, it is to be understood that other forms might be adopted, all coming within the scope of the claims which follow.

What I claim is as follows:

1. In a mechanism for connecting a rotatable device with a gear, the combination with a pinion slidably connected with said device; of manually operable means independent of the rotatable device for shifting said pinion and for producing rotation thereof previous to engagement with said gear, and then for meshing the pinion with the gear without effecting rotation of said pinion.

2. In a mechanism for connecting a rotatable device with a gear, the combination with a pinion slidably connected with said device; of manually operable means for shifting said pinion toward said gear and for producing rotation thereof previous to engagement with said gear, and for moving said pinion away from said gear without producing rotation thereof.

3. In a mechanism for connecting a rotatable device with a gear, the combination with a pinion slidably connected with said device; of manually operable means for shifting said pinion and for producing rotation thereof previous to engagement with said gear, and then for meshing the pinion with the gear without effecting rotation of said pinion, said means being arranged to disengage said pinion from said gear without effecting rotation of said pinion.

4. In a mechanism for connecting a rotatable device with a gear, the combination with a shaft connected with said device; of a pinion splined on said shaft; means for shifting said pinion along said shaft; and means operable concurrently therewith for turning said shaft previous to enmeshment of said pinion with said gear, said means permitting the shaft to remain stationary while the pinion is being moved away from the gear.

5. In a mechanism for connecting a rotatable device with a gear, the combination with a shaft connected with said device; of a pinion splined on said shaft; means for shifting said pinion along said shaft; and means operable concurrently therewith for turning said shaft previous to enmeshment of said pinion with said gear, and then permitting the shaft to remain stationary while said pinion is meshing with said gear, said means permitting the shaft to remain stationary while the pinion is being disengaged from said gear.

6. In an engine starting mechanism; an engine gear; a starting motor; a motor driven pinion adapted to be meshed with the engine gear; and mechanical means independent of the motor for rotating the pinion in one direction only, prior to contact with the engine gear.

7. In an engine starting mechanism; an engine gear; a starting motor; a motor driven pinion adapted to be meshed with the engine gear; and mechanical means independent of the motor adapted to progressively rotate the pinion through relatively small angles and in one direction only, prior to contact of the pinion with the gear.

8. In an engine starting mechanism; an engine gear; a starting motor; an overrunning clutch; a shaft connected with the motor through said overrunning clutch; a pinion driven by the shaft and adapted to mesh with the engine gear; and means including the overrunning clutch for rotating the pinion independent of the motor and advancing the pinion into enmeshment with the engine gear.

9. In an engine starting mechanism; an engine gear; a starting motor; an overrunning clutch; a shaft connected with the motor through said overrunning clutch; a pinion driven by the shaft and adapted to mesh with the engine gear; and means including the overrunning clutch for rotating the pinion independent of the motor and advancing the pinion into enmeshment with the engine gear and for thereafter starting the motor.

In testimony whereof I hereto affix my signature.

ELMER H. SCHWARZ.

Witnesses:
H. R. SOLLENBERGER,
I. A. GREENWALD.